(12) United States Patent
Nakamura

(10) Patent No.: US 11,945,325 B2
(45) Date of Patent: Apr. 2, 2024

(54) POWER SUPPLY FACILITY AND CONTROL METHOD OF POWER SUPPLY FACILITY

(71) Applicant: TOYOTA JIDOSHA KABUSHIKI KAISHA, Toyota (JP)

(72) Inventor: Masateru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 17/868,324

(22) Filed: Jul. 19, 2022

(65) Prior Publication Data

US 2023/0071773 A1 Mar. 9, 2023

(30) Foreign Application Priority Data

Sep. 3, 2021 (JP) ................................. 2021-143736

(51) Int. Cl.
| | |
|---|---|
| B60L 53/14 | (2019.01) |
| B60L 53/31 | (2019.01) |
| B60L 53/35 | (2019.01) |
| B60L 53/60 | (2019.01) |
| B60L 53/66 | (2019.01) |
| H02J 7/00 | (2006.01) |

(52) U.S. Cl.
CPC ............... B60L 53/60 (2019.02); B60L 53/14 (2019.02); B60L 53/31 (2019.02); B60L 53/35 (2019.02); B60L 53/66 (2019.02); H02J 7/0042 (2013.01)

(58) Field of Classification Search
CPC ........ B60L 53/124; B60L 53/14; B60L 53/30; B60L 53/31; B60L 53/35; B60L 53/60; B60L 53/66; H02J 7/00034; H02J 7/0042; Y02T 10/70; Y02T 10/7072; Y02T 90/12
See application file for complete search history.

(56) References Cited

U.S. PATENT DOCUMENTS

| | | | |
|---|---|---|---|
| 2011/0066515 A1* | 3/2011 | Horvath | B60L 53/36 705/17 |
| 2013/0307477 A1* | 11/2013 | Reinschke | B60L 53/30 320/109 |
| 2016/0207406 A1* | 7/2016 | Kauffmann | B60L 53/30 |
| 2021/0053456 A1* | 2/2021 | Freeling-Wilkinson | B60L 53/14 |
| 2021/0205829 A1* | 7/2021 | Zhu | B05B 9/035 |
| 2021/0252989 A1* | 8/2021 | Price | B60L 53/31 |

FOREIGN PATENT DOCUMENTS

JP   5475407 B2   4/2014

* cited by examiner

*Primary Examiner* — Levi Gannon
(74) *Attorney, Agent, or Firm* — Sughrue Mion, PLLC

(57) ABSTRACT

A charging stand is a power supply facility that is storable under a ground, and includes: a power supply unit (including a connector, a power supply cable and a power supply circuit) for supplying electric power to a vehicle on the ground; and a control device that controls supply of the electric power by the power supply unit. The control device allows the supply of the electric power by the power supply unit when the water is not accumulated inside the charging stand. With the above, when the water is not accumulated inside the charging stand, the power supply unit can supply the electric power to the vehicle.

11 Claims, 5 Drawing Sheets

POWER SUPPLY FACILITY AND CONTROL METHOD OF POWER SUPPLY FACILITY

CROSS-REFERENCE TO RELATED APPLICATION

This application claims priority to Japanese Patent Application No. 2021-143736 filed on Sep. 3, 2021, incorporated herein by reference in its entirety.

BACKGROUND

1. Technical Field

The present disclosure relates to a power supply facility and a control method of the power supply facility, and more particularly to a power supply facility that can be stored under the ground and a control method of the power supply facility thereof

2. Description of Related Art

A charging facility for charging a power storage device mounted on a vehicle or the like is installed in, for example, a parking lot or a sidewalk. However, the charging facility occupies the installation space, and therefore may interfere with walking or traveling of the vehicle. Therefore, for example, a technique for storing the charging facility under the ground has been devised, such as a charging pole disclosed in Japanese Patent No. 5475407 (JP 5475407 B).

SUMMARY

The charging facility as described above can be stored under the ground. Therefore, the charging facility may be submerged. When the charging facility is used while water is accumulated in the charging facility, this may cause a failure of the charging facility.

The present disclosure has been made to solve the above-mentioned issue, and an object thereof is to provide a power supply facility and a control method of the power supply facility that can avoid a risk of failure caused by water.

A power supply facility according to the present disclosure is a power supply facility that is storable under a ground, and includes: a power supply unit for supplying electric power to a vehicle on the ground; and a control unit that controls supply of the electric power by the power supply unit. The control unit allows the supply of the electric power by the power supply unit when water is not accumulated inside of the power supply facility.

With the configuration above, when water is not accumulated inside of the power supply facility, the power supply unit can supply the electric power to the vehicle. As a result, it is possible to provide a power supply facility capable of avoiding the risk of a failure due to water.

The power supply facility may further include a discharge unit that discharges the water accumulated the inside. With the configuration above, the water accumulated inside of the power supply facility can be reliably discharged.

The control unit may control the discharge unit such that the accumulated water is discharged when the water is accumulated the inside. With the above, the water accumulated inside of the power supply facility can be reliably discharged.

The power supply facility may further include a detection unit that detects that the water is accumulated the inside. The control unit may determine that the water is accumulated the inside when the detection unit detects that the water is accumulated.

With the configuration above, accumulation of the water inside of the power supply facility can be reliably determined.

The power supply unit may include a power supply port and a power supply circuit. The power supply facility may further include a housing that covers the inside including the power supply circuit and the control unit such that water hardly enters the inside. With the configuration above, it is possible to suppress water from entering the inside of the power supply facility.

The power supply facility may further include a movable portion that is provided with the power supply port and is displaceable between a position where the power supply port is stored under the ground and a position where the power supply port is exposed above the ground, and an actuator that displaces the movable portion. The control unit may further control the actuator. With the configuration above, the power supply port can be automatically displaced between above and below the ground.

According to another aspect of the present disclosure, a control method of a power supply facility is a control method of a power supply facility that is storable under a ground. The power supply facility includes: a power supply unit for supplying electric power to a vehicle on the ground; and a control unit that controls supply of the electric power by the power supply unit. The control method includes a step of allowing the supply of the electric power by the power supply unit when water is not accumulated inside of the power supply facility.

With the configuration above, it is possible to provide a control method of a power supply facility capable of avoiding the risk of a failure due to water.

According to the present disclosure, it is possible to provide a power supply facility and a control method of the power supply facility capable of avoiding the risk of a failure due to water.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
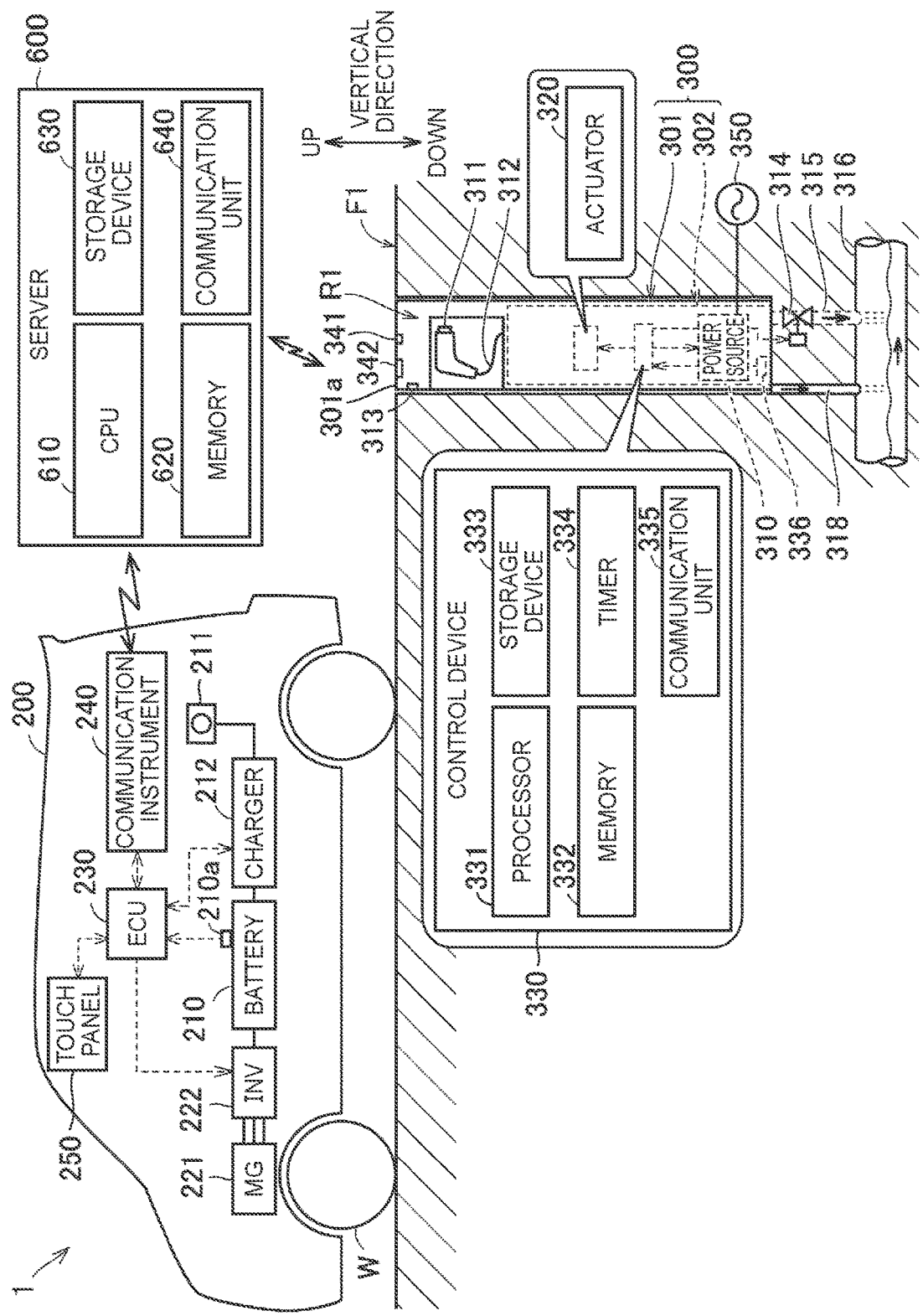
FIG. 1 is a diagram showing a configuration of a vehicle and a power supply facility according to the present embodiment.

Hereinafter, an embodiment of the present disclosure will be described in detail with reference to the drawings. In the drawings, the same or corresponding parts are denoted by the same reference signs and the description thereof will not be repeated.

FIG. 1 is a diagram showing a configuration of a vehicle and a power supply facility according to the present embodiment. A plurality of electric power supply facilities included in a power supply system 1 according to the present embodiment is a charging stand 300 shown in FIG. 1. The charging stand 300 corresponds to electric vehicle supply equipment (EVSE).

With reference to FIG. 1, the charging stand 300 is configured to be stored under a ground F1. The charging stand 300 corresponds to underground power supply facility (power supply facility that can be stored under the ground). The state of the charging stand 300 shown in FIG. 1 is a state in which the charging stand 300 is stored under the ground F1 (hereinafter, also referred to as a "stored state").

The charging stand 300 includes a movable portion 301 and a fixed portion 302. Each of the movable portion 301 and the fixed portion 302 includes a cylindrical housing. The housing of each of the movable portion 301 and the fixed portion 302 is not limited to a cylindrical shape, and may have another shape or a square columnar shape. The material of each housing may be metal or plastic. The surface of each housing may be waterproofed. The housing of the movable portion 301 has a larger diameter than that of the housing of the fixed portion 302, and is disposed outside the housing of the fixed portion 302 such that the central axes of the housings coincide with each other. The movable portion 301 is provided so as to be displaceable in the vertical direction (up-down direction) along the outer peripheral surface of the fixed portion 302.

A sealing member (not shown) is provided at the lower end of the movable portion 301 such that foreign matter such as water and dust does not easily enter through the gap between the movable portion 301 and the fixed portion 302. The charging stand 300 is configured by the sealing member and the housings of the movable portion 301 and the fixed portion 302 such that foreign matter does not easily enter the inside of the movable portion 301 and the fixed portion 302.

The charging stand 300 is installed in a recess R1 extending downward from the ground F1. In the stored state, the entire charging stand 300 is stored inside the recess R1. The fixed portion 302 is fixed to the bottom surface of the recess R1. The fixed portion 302 includes a power supply circuit 310, an actuator 320, and a control device 330 in the housing. The movable portion 301 is driven by the actuator 320 and is displaced relative to the fixed portion 302. A sealing member (not shown) may be provided in the gap between the outer peripheral surface of the housing of the movable portion 301 and the inner wall of the recess R1.

The movable portion 301 has a space for storing a connector 311 and a power supply cable 312 (hereinafter referred to as "cable storage portion"). The cable storage portion is, for example, a recess provided in the side surface of the movable portion 301 by machining a part of the cylindrical housing of the movable portion 301. The connector 311 is provided to a first end of the power supply cable 312. A second end (the end opposite from the first end) of the power supply cable 312 is connected to the power supply circuit 310 via an electric wire (not shown). In the stored state, the movable portion 301 includes the connector 311 and the power supply cable 312 in the cable storage portion. In the present embodiment, the connector 311 corresponds to an example of the "power supply port" according to the present disclosure.

The power supply cable 312 (including the connector 311) may be configured to be detachable from the movable portion 301. In the movable portion 301 with the power supply cable 312 detached, a connector for the power supply cable 312 (for example, a portion to which the power supply cable 312 is attached) corresponds to the power supply port of the movable portion 301.

The power supply circuit 310 is configured to be supplied with electric power from an alternating current (AC) power source 350 and supply electric power to the movable portion 301 (more specifically, the power supply cable 312). The AC power source 350 supplies AC power to the power supply circuit 310. The AC power source 350 may be a commercial power source (for example, a power system provided by a power company). The power supply circuit 310 is controlled by the control device 330.

The power supply cable 312 has flexibility. The cable storage portion may be provided with a cable reel configured such that the power supply cable 312 can be wound around the cable reel. The cable reel may be a mechanical self-winding device (for example, a spring cable reel). Further, a lid (not shown) for opening and closing the cable storage portion may be provided. Further, a sensor for detecting whether the connector 311 and the power supply cable 312 are housed in the cable storage portion may be provided in the cable storage portion.

In the stored state, a top surface 301a of the movable portion 301 is flush with the ground F1. The actuator 320 is configured to directly or indirectly apply power to the movable portion 301 to move the movable portion 301 in the vertical direction (see FIG. 2 described later). The actuator 320 may be an electric actuator that generates power by using electric power supplied from the power supply circuit 310. The displacement mechanism of the movable portion 301 may be a rack and pinion mechanism. For example, the displacement mechanism may be configured such that a rack gear is fixed to the movable portion 301, and the actuator 320 rotationally drives a pinion gear meshed with the rack gear. Alternatively, the displacement mechanism may be configured such that a rod connected to the piston is fixed to the movable portion 301, and the actuator 320 moves the piston using a hydraulic pressure or an air pressure. Alternatively, the actuator 320 may generate a magnetic force using electric power and directly apply power to the movable portion 301 using the magnetic force. The actuator 320 is controlled by the control device 330.

Figure 2:
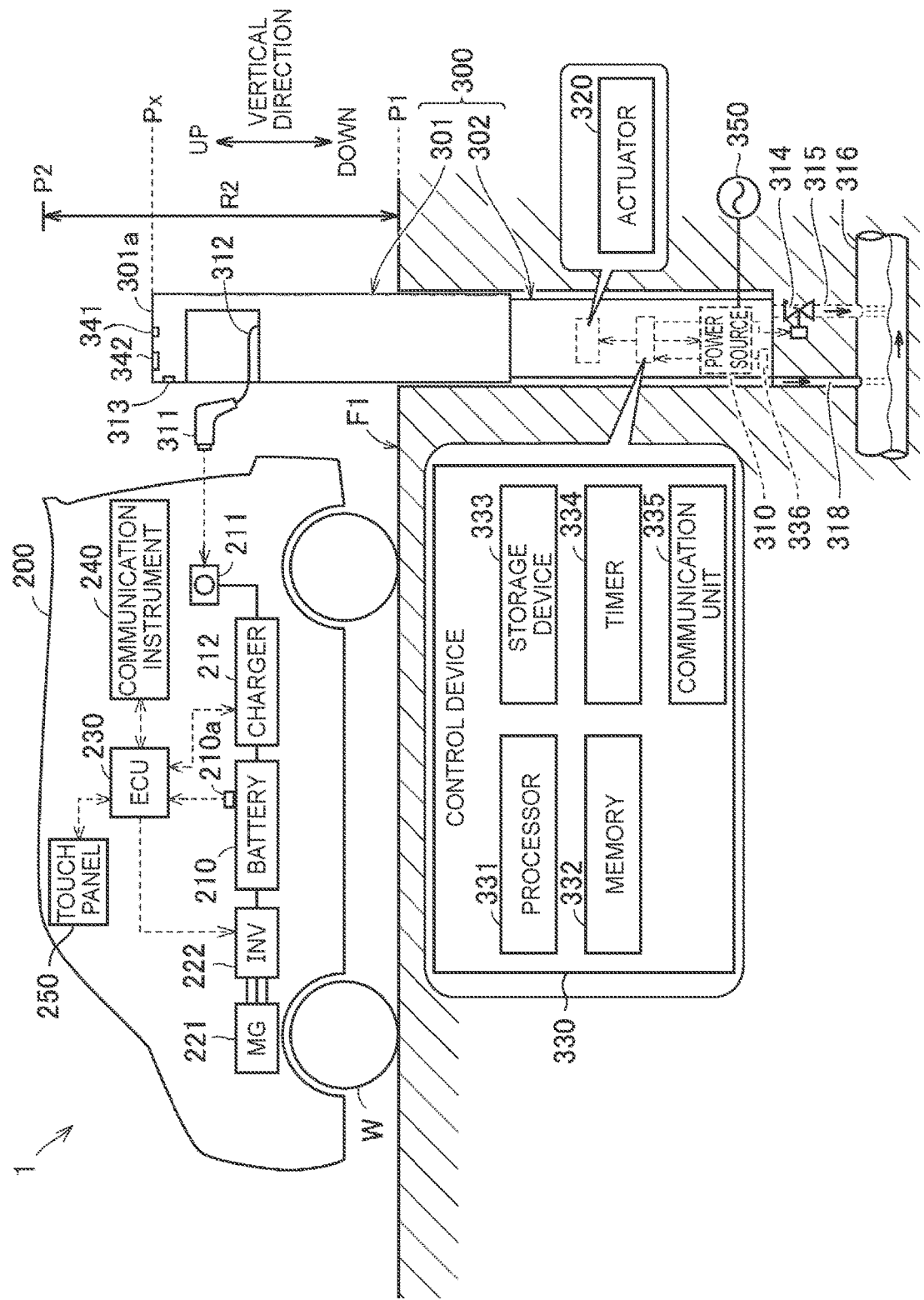
FIG. 2 is a diagram showing a state in which a movable portion is raised.

FIG. 2 is a diagram showing a state in which the movable portion 301 is raised. With reference to FIG. 2, the movable portion 301 is displaced (raised and lowered) in the vertical direction so as to change a position Px of the top surface 301a. Hereinafter, for convenience of description, the position Px of the top surface 301a of the movable portion 301 is regarded as the position of the movable portion 301.

The movable portion 301 is configured to be displaced within a movable range R2. A lower limit position P1 of the movable range R2 is the same height as the ground F1. When the position of the movable portion 301 is the lower limit position P1, the entire movable portion 301 (including the cable storage portion) is stored under the ground F1. When the position of the movable portion 301 is higher than the lower limit position P1, at least a part of the movable portion 301 is exposed above the ground F1. An upper limit position P2 of the movable range R2 is set to a position sufficiently higher than the height of the inlet of a general vehicle. When the position of the movable portion 301 is the upper limit position P2, the cable storage portion (the connector 311 and the power supply cable 312) of the movable portion 301 is exposed above the ground F1. Further, even when the position of the movable portion 301 is lower than the upper limit position P2 (for example, the position Px shown in FIG. 2), the cable storage portion can be exposed above the ground F1. As described above, the movable range R2 includes a first position (for example, the lower limit position P1) at which the power supply port is housed under the ground and a second position (for example, the upper limit position P2) at which the power supply port is exposed above the ground. In the present embodiment, the lower limit position P1 is the same position as the ground F1, but the lower limit position P1 may be set to a position below the ground F1.

With reference to FIG. 1, the movable portion 301 further includes a communication device 341, a notification device 342, and a touch panel display 313. The communication device 341 is configured to be capable of wirelessly communicating with a server 600 that will be described later. The communication device 341 may be configured to be able to communicate with a communication device other than the server 600. The communication device 341 transmits information received from the outside of the charging stand 300 to the control device 330. The control device 330 sequentially transmits the state of the charging stand 300 to the server 600 via the communication device 341.

The notification device 342 is provided near the top surface 301a of the movable portion 301. In the present embodiment, the notification device 342 includes a lamp and a speaker. The lamp may be a light emitting diode (LED) lamp. The control device 330 controls the lighting state of the lamp (for example, lighting, blinking, and extinguishing). The control device 330 controls the speaker so as to cause the speaker to perform notification by sound (including voice). The touch panel display 313 receives input from the user and displays various types of information. The touch panel display 313 is configured to receive instructions regarding power supply (for example, instructions for starting and stopping power supply). The touch panel display 313 is also configured to display the state of power supply (power supply being performed or power supply stopped) of the charging stand 300. The touch panel display 313 is controlled by the control device 330.

The control device 330 may be a computer. The control device 330 includes a processor 331, a memory 332, a storage device 333, a timer 334, and a communication unit 335. As the processor 331, for example, a central processing unit (CPU) can be adopted. In addition to a program, the memory 332 stores information used in the program (for example, maps, mathematical formulas, and various parameters). In the present embodiment, as the processor 331 executes the program stored in the memory 332, various controls in the charging stand 300 are executed. However, the various controls in the charging stand 300 are not limited to execution by software, and execution by dedicated hardware (electronic circuit) is also possible. The number of processors included in the control device 330 can be set as appropriate, and a processor may be prepared for each predetermined control. The storage device 333 is configured to be able to store the stored information. The communication unit 335 is an interface with the communication device 341.

The timer 334 is configured to notify the processor 331 of the arrival of the set time. At the time set in the timer 334, the timer 334 transmits a signal for notifying the arrival of the set time to the processor 331. However, the timer 334 may be hardware (timer circuit), or may be realized by software. Further, the control device 330 can acquire the current time using a real-time clock (RTC) circuit (not shown) built in the control device 330.

The vehicle 200 shown in FIGS. 1 and 2 is an electrified vehicle including a battery 210, devices for traveling using electric power stored in the battery 210 (for example, a motor generator (hereinafter referred to as "MG") 221 and an inverter (hereinafter referred to as "INV") 222 that will be described later), and devices for charging the battery 210 using the charging stand 300 (for example, an inlet 211 and a charger 212 described later). The vehicle 200 according to the present embodiment is a battery electric vehicle (BEV) without an engine (internal combustion engine).

The vehicle 200 further includes an electronic control unit (hereinafter referred to as "ECU") 230, a communication instrument 240, and a touch panel display 250. The ECU 230 may be a computer. The ECU 230 includes a processor, a memory, and a storage device (none of which are shown). Various vehicle controls are executed as the processor executes the program stored in the memory. However, the vehicle control is not limited to execution by software, and execution by dedicated hardware (electronic circuit) is also possible.

The touch panel display 250 receives a touch operation by the user and outputs the contents of the received touch operation to the ECU 230. The ECU 230 executes the process in accordance with the program corresponding to the content of the touch operation. The ECU 230 outputs a signal for displaying the execution result of the program to the touch panel display 250. The touch panel display 250 displays an image corresponding to a signal from the ECU 230.

The ECU 230 is configured to communicate with the outside of the vehicle 200 through the communication instrument 240. The communication instrument 240 includes various communication interfaces (I/Fs). The communication instrument 240 includes a communication I/F for wireless communication with the server 600 (FIG. 1) described later.

The battery 210 is configured to include a secondary battery such as a lithium ion battery or a nickel metal hydride battery. The secondary battery may be a battery assembly or an all-solid-state battery. Instead of the secondary battery, another power storage device such as an electric double layer capacitor may be adopted.

The vehicle 200 further includes a monitoring module 210a that monitors the state of the battery 210. The monitoring module 210a includes various sensors for detecting the state of the battery 210 (for example, voltage, current, and temperature), and outputs the detection result to the ECU 230. The monitoring module 210a may be a battery management system (BMS) having a state of charge (SOC) estimation function, a state of health (SOH) estimation function, a cell voltage equalization function, a diagnostic function, and a communication function, in addition to the above sensor function. The ECU 230 can acquire the state of the battery 210 (for example, temperature, current, voltage, SOC, and internal resistance) based on the output of the monitoring module 210a.

The vehicle 200 includes an MG 221 and an INV 222 for electric driving. The MG 221 is, for example, a three-phase AC motor generator. The MG 221 is driven by the INV 222 and is configured to rotate drive wheels W of the vehicle 200. The INV 222 drives the MG 221 using electric power supplied from the battery 210. Further, the MG 221 generates regenerative power and supplies the generated electric power to the battery 210 via the INV 222. The drive system of the vehicle 200 is not limited to the front wheel drive shown in FIGS. 1 and 2, and may be rear wheel drive or four-wheel drive.

The vehicle 200 includes the inlet 211 and the charger 212 for contact charging. The inlet 211 is configured such that the connector 311 of the power supply cable 312 of the charging stand 300 can be connected to the inlet 211. A contact is included in each of the inlet 211 and the connector 311. When the connector 311 is attached to the inlet 211, the contacts come into contact with each other, and the inlet 211 and the connector 311 are electrically connected. Hereinafter, the state in which the connector 311 is connected to the inlet 211 (that is, the state in which the charging stand 300 and the vehicle 200 are electrically connected via the power supply cable 312) is referred to as a "plug-in state". Further, the state in which the connector 311 is not connected to the inlet 211 (that is, the state in which the charging stand 300 and the vehicle 200 are not electrically connected) is referred to as a "plug-out state".

The charger 212 includes a power conversion circuit (not shown). The power conversion circuit converts electric power supplied to the inlet 211 from the outside of the vehicle into electric power suitable for charging the battery 210. For example, when AC power is supplied from the inlet 211, the charger 212 converts the supplied AC power into direct current (DC) power and supplies the converted power to the battery 210. The charger 212 is controlled by the ECU 230.

The server 600 included in the power supply system 1 shown in FIG. 1 includes a CPU 610, a memory 620, a storage device 630, and a communication unit 640. The CPU 610 is configured to execute predetermined information processing. The memory 620 is configured to store a program executed by the CPU 610 and data during execution of the program. The storage device 630 is configured to be able to store various types of information. The communication unit 640 includes various communication I/Fs. The CPU 610 is configured to communicate with the outside via the communication unit 640. The server 600 is configured to be capable of communicating with the charging stand 300. The server 600 may also be configured to communicate with the vehicle 200 via the charging stand 300 while the battery 210 is being charged.

A plurality of vehicles (including the vehicle 200), a plurality of users (including a user of the vehicle 200), and a plurality of sets of EVSE (including the charging stand 300) are registered in the server 600. The server 600 is configured to manage information on each registered user (hereinafter, also referred to as "user information"), information on each registered vehicle (hereinafter, also referred to as "vehicle information"), and information on each registered set of EVSE (hereinafter, also referred to as "EVSE information"). The information on the user terminals is included in at least one of the user information and the vehicle information. The user information, the vehicle information, and the EVSE information are stored in the storage device 630 of the server 600.

Identification information for identifying a user (user ID) is assigned to each user, and the server 600 manages the user information by distinguishing the user information by the user ID. The user ID also functions as information for identifying a user terminal (terminal ID). The user information includes, for example, communication address and location information of a mobile terminal carried by the user, and information for identifying a vehicle belonging to the user (vehicle ID). Further, identification information for identifying a vehicle (vehicle ID) is assigned to each vehicle, and the server 600 manages the vehicle information by distinguishing the vehicle information by the vehicle ID. The vehicle information includes, for example, vehicle specifications (for example, specifications related to charging), and information received by the server 600 from the user terminal (for example, vehicle traveling plan). Further, identification information for identifying the EVSE (EVSE-ID) is assigned to each set of EVSE, and the server 600 manages the EVSE information by distinguishing the EVSE information by the EVSE-ID. The EVSE information includes the connection state of the EVSE (plug-in state or plug-out state), the combination of the EVSE and the vehicle in the plug-in state (vehicle ID and EVSE-ID), and the power supply state of the EVSE (power supply being performed or power supply stopped).

The charging stands 300 having the configurations shown in FIGS. 1 and 2 may be set at multiple locations. The charging stands 300 may be configured such that the charging stands 300 are communicable with each other. The communication method may be wireless or wired. Hereinafter, layout examples of the charging stands 300 will be described with reference to FIGS. 3 and 4.

Figure 3:
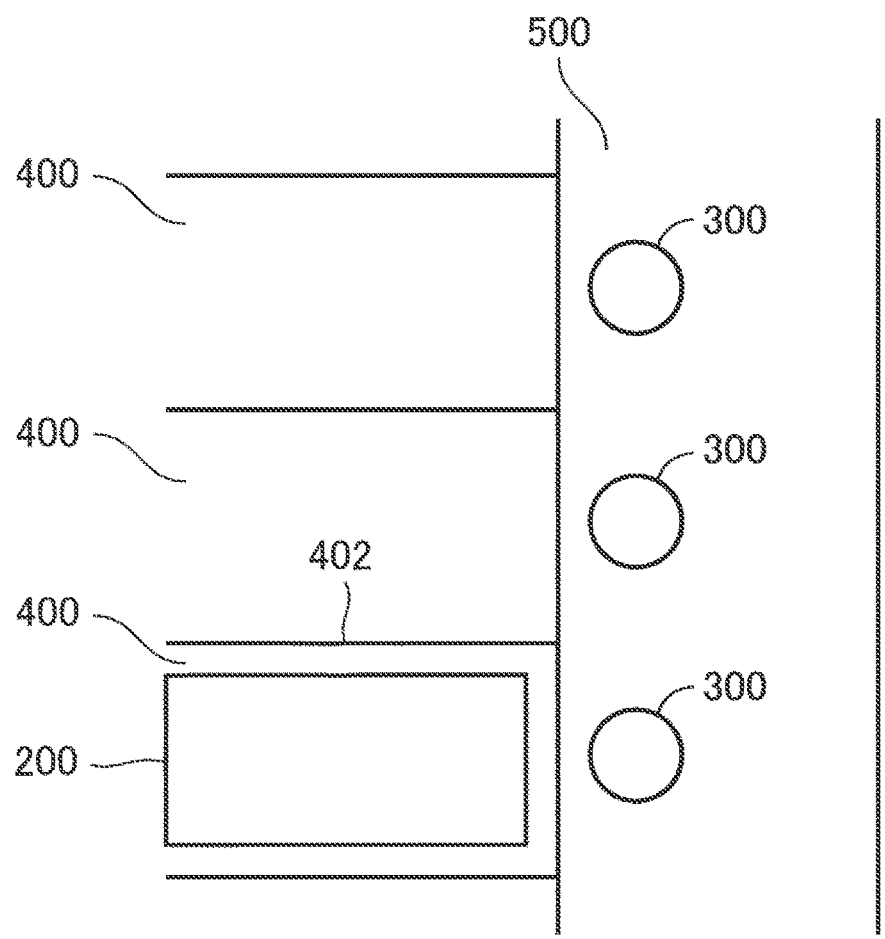
FIG. 3 is a diagram showing a first layout example of charging stands.

FIG. 3 is a diagram showing a first layout example of the charging stands 300. With reference to FIG. 3, in this example, multiple parking spaces 400 are partitioned by partition lines 402 so as to be arranged side by side (in a row) in the parking lot. A sidewalk 500 is provided along the lateral direction (direction orthogonal to the longitudinal direction) of the parking spaces 400. The sidewalk 500 is adjacent to each parking space 400. The charging stand 300 is installed at a position adjacent to each parking space 400 on the sidewalk 500. The charging stand 300 is provided for each parking space 400. The charging stands 300 are lined up along the sidewalk 500.

Figure 4:
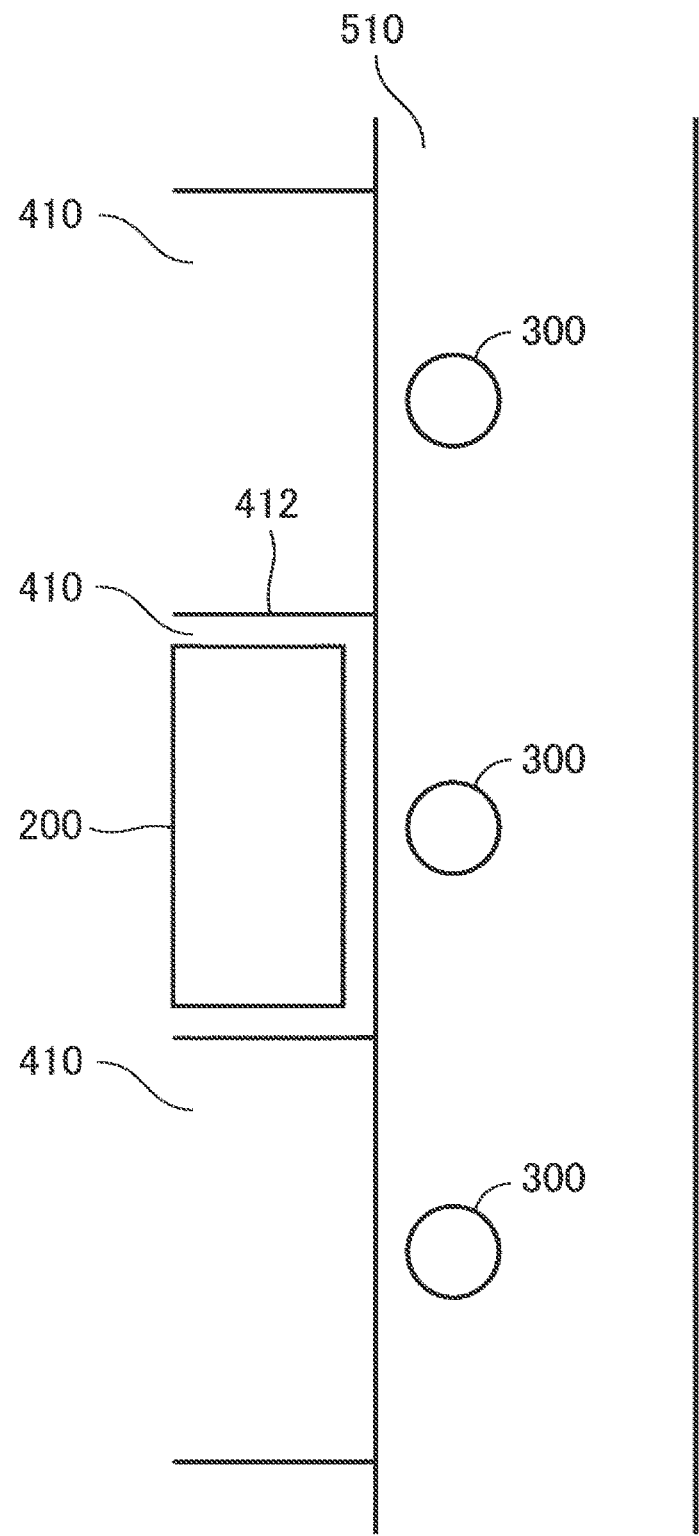
FIG. 4 is a diagram showing a second layout example of the charging stands.

FIG. 4 is a diagram showing a second layout example of the charging stands 300. With reference to FIG. 4, in this example, multiple parking spaces 410 are partitioned by partition lines 412 so as to be arranged parallel (in parallel) in the parking lot. A sidewalk 510 is provided along the longitudinal direction of the parking spaces 410. The sidewalk 510 is adjacent to each parking space 410. The charging stand 300 is installed at a position adjacent to each parking space 410 on the sidewalk 510. The charging stand 300 is provided for each parking space 410. The charging stands 300 are lined up along the sidewalk 510.

An example of an operational flow in which the user of the vehicle 200 operates the charging stand 300 to charge the battery 210 will be described. When the charging stand 300 is not in use, the charging stand 300 is in the stored state (for example, the state shown in FIG. 1).

When the user parks the vehicle 200 in the parking space near the charging stand 300 and operates the touch panel display 250 of the vehicle 200 to start charging with the charging stand 300, the ECU 230 of the vehicle 200 transmits request information for starting charging to the server 600 via the communication instrument 240 and the communication unit 640 of the server 600. Upon receipt of the request information, the CPU 610 of the server 600 transmits control information for raising the movable portion 301 of the designated charging stand 300 to the charging stand 300 via the communication unit 640 and the communication unit 335 of the control device 330 of the charging stand 300. Upon receipt of the control information, the processor 331 of the control device 330 of the charging stand 300 controls the actuator 320 so as to start raising the movable portion 301. The movable portion 301 is raised to a position where the connector 311 of the power supply cable 312 can be easily connected to the inlet 211 of the vehicle 200 (for example, the position Px shown in FIG. 2). With the above, the charging stand 300 is ready for plug-in. Hereinafter, the state in which the movable portion 301 is raised to a position where the plug-in is possible is also referred to as a "raised state".

For example, with the charging stand 300 in the raised state as shown in FIG. 2, the user takes out the power supply cable 312 from the cable storage portion of the movable portion 301 and extends the power supply cable 312 toward the vehicle 200. Then, the user connects the connector 311 of the power supply cable 312 to the inlet 211 of the vehicle 200. With the above, the vehicle 200 and the charging stand 300 are brought into the plug-in state. In the plug-in state, communication between the vehicle 200 and the charging stand 300 becomes possible, and electric power can be exchanged between the vehicle 200 and the charging stand 300. The ECU 230 of the vehicle 200 communicates with the control device 330 of the charging stand 300 via the power supply cable 312.

The user operates the touch panel display 313 of the charging stand 300 in the plug-in state to cause the charging stand 300 to supply electric power. The charging stand 300 starts power supply in accordance with an instruction from the user. Specifically, in the charging stand 300, the power supply circuit 310 converts (for example, transforms) the AC power supplied from the AC power source 350 into AC power suitable for power supply to the vehicle 200, and supplies the converted power to the power supply cable 312. In the plug-in state, the electric power supplied from the power supply circuit 310 to the power supply cable 312 is input to the inlet 211 of the vehicle 200. Then, the battery 210 is charged in the vehicle 200. Specifically, the electric power input to the inlet 211 is supplied to the battery 210 via the charger 212. While the battery 210 is being charged, the control device 330 controls the power supply circuit 310 so as to adjust the supplied electric power, and the ECU 230 controls the charger 212 so as to adjust the charging electric power. As described above, the charging stand 300 is configured to charge the power storage device mounted on the vehicle.

After that, when charging of the battery 210 is completed, the user operates the touch panel display 313 of the charging stand 300 to instruct power supply stop to the charging stand 300. When the battery 210 is fully charged, the ECU 230 automatically transmits stop instruction to the control device 330. The charging stand 300 stops power supply in accordance with the stop instruction. Then, the user pulls out the connector 311 of the power supply cable 312 from the inlet 211 of the vehicle 200, and stores the power supply cable 312 in the cable storage portion. With the above, the vehicle 200 and the charging stand 300 are brought into the plug-out state. When the user returns the power supply cable 312 to the cable storage portion and operates the touch panel display 313 to lower the movable portion 301, the control device 330 lowers the movable portion 301 to the lower limit position P1 of the movable range R2. When the position of the movable portion 301 reaches the lower limit position P1, the ground F1 and the top surface 301a of the movable portion 301 become flush with each other. Thus, the charging stand 300 is brought into the stored state again.

The charging stand 300 as described above can be stored under the ground. Therefore, the charging stand 300 may be submerged. When the charging stand 300 is used while water is accumulated inside of the charging stand 300, this may cause a failure of the charging stand 300.

Therefore, the control device 330 of the charging stand 300 permits power supply by a power supply unit (including the connector 311, the power supply cable 312, and the power supply circuit 310) when water is not accumulated inside of the charging stand 300.

With the above, when water is not accumulated inside of the charging stand 300, the power supply unit can supply electric power to the vehicle 200. As a result, the risk of a failure due to water can be avoided.

With reference to FIGS. 1 and 2 again, a sewage pipe 316 for draining sewage such as rainwater to a sewage treatment facility or a river is provided in the ground below the bottom surface of the recess R1. A drainage pipe 318 is connected to the sewage pipe 316 from the bottom surface of the recess R1. The drainage pipe 318 allows water such as rainwater accumulated in the recess R1 to be drained to the sewage pipe 316.

A drainage pipe 315 is provided downward on the bottom surface of the fixed portion 302 of the charging stand 300. The drainage pipe 315 of the charging stand 300 is connected to the sewage pipe 316. An automatic on-off valve 314 is provided in the middle of the drainage pipe 315. The control device 330 can control the automatic on-off valve 314 to open and close. When the automatic on-off valve 314 is opened, the water accumulated in the charging stand 300 is discharged to the sewage pipe 316 through the drainage pipe 315. When the automatic on-off valve 314 is closed, water does not flow to the drainage pipe 315.

A water detection sensor 336 is provided on the bottom surface of the fixed portion 302 of the charging stand 300. When water comes into contact with the detection surface, the water detection sensor 336 outputs a signal indicating contact of water to the control device 330. With the above, the water accumulated on the bottom surface of the charging stand 300 can be detected.

Figure 5:
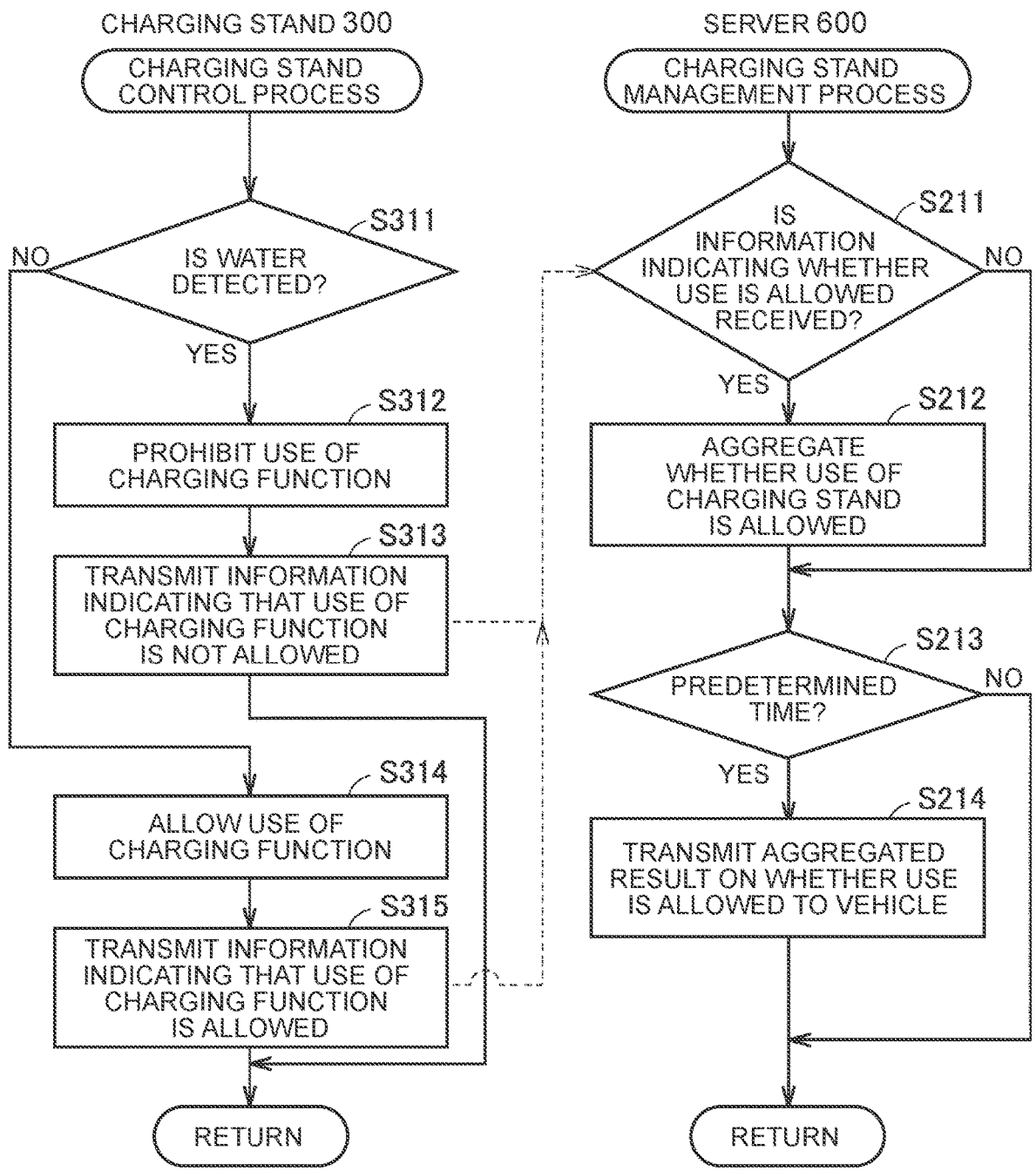
FIG. 5 is a flowchart showing a flow of processes when water is accumulated in the charging stand in the present embodiment.

FIG. 5 is a flowchart showing a flow of processes when water is accumulated in the charging stand 300 in the present embodiment. The program for the charging stand control process is stored in the memory 332 of the control device 330, and is periodically called and executed from the higher-level process by the processor 331 of the control device 330 of the charging stand 300. The program for the charging stand management process is stored in the storage device 630 of the server 600, and is periodically called and executed from the higher-level process by the CPU 610 of the server 600.

With reference to FIG. 5, in the charging stand control process, the processor 331 of the control device 330 determines whether water accumulated in the charging stand 300 has been detected by determining whether a signal indicating that water has been detected is received from the water detection sensor 336 (step S311). When the processor 331 of the control device 330 determines that water has been detected (YES in step S311), the processor 331 prohibits use of the charging function by controlling the power supply circuit 310 so as not to operate (step S312). Then, the processor 331 of the control device 330 transmits information indicating that use of the charging function in the charging stand 300 is not allowed to the server 600 (step S313).

When the processor 331 of the control device 330 determines that water has not been detected (NO in step S311), the processor 331 allows use of the charging function by controlling the power supply circuit 310 so as to be operable (step S314). Then, the processor 331 of the control device 330 transmits information indicating that use of the charging function in the charging stand 300 is allowed to the server 600 (step S315). After step S313 or step S315, the processor 331 of the control device 330 returns the process to be executed to the process higher than the caller of the charging stand control process.

In the charging stand management process, the CPU 610 of the server 600 determines whether information indicating whether use of the charging function is allowed has been received from the charging stand 300 (step S211). When the CPU 610 of the server 600 determines that the information indicating whether use of the charging function is allowed is received (YES in step S211), the CPU 610 aggregates whether use of each charging stand 300 is allowed by causing the memory 620 or the storage device 630 to store information indicating whether use of the charging function is allowed in association with the ID of the charging stand 300 that transmits the information (step S212).

When the CPU 610 of the server 600 determines that the information indicating whether use of the charging function is allowed has not been received (NO in step S211), or after step S212, the CPU 610 determines whether the current time has reached a predetermined time (step S213). The predetermined time may be any time as long as the time is predetermined, and may be a predetermined time (for example, every minute, or every hour on the hour), or every predetermined period (for example, every minute, every 10 minutes, or every hour).

When the CPU 610 of the server 600 determines that the current time has reached the predetermined time (YES in step S213), the CPU 610 transmits the aggregated result stored in the memory 620 or the storage device 630 indicating whether use of each charging stand 300 is allowed to the vehicle 200 (step S214). With the above, in each vehicle 200, the user can understand which charging stand 300 can be used or cannot be used.

When the CPU 610 of the server 600 determines that the current time has not reached the predetermined time (NO in step S213), or after step S214, the CPU 610 returns the process to be executed to the higher-level process of the caller of the present charging stand management process.

Modification (1) In the above-described embodiment, as shown in FIGS. 1 and 2, the movable portion 301 of the charging stand 300 is raised and lowered by the actuator 320. However, the present disclosure is not limited to this, and the movable portion 301 may be configured so as to be manually raised and lowered by the user.

(2) In the above-described embodiment, as shown in FIGS. 1 and 2, the movable portion 301 of the charging stand 300 is configured to be able to be raised and lowered. However, the charging stand 300 is not limited to this, and may be composed of only a fixed portion including a portion above the ground and a portion below the ground.

(3) In the above-described embodiment, as shown in FIGS. 1 and 2, the discharge unit that discharges water accumulated in the charging stand 300 is composed of the drainage pipe 315 and the automatic on-off valve 314. However, the discharge unit is not limited to this, and may have any configuration as long as water can be discharged, and for example, may be composed of a pump (for example, an electric pump) that discharges water accumulated in the charging stand 300 and a drainage pipe.

(4) In the above-described embodiment, as shown in FIGS. 1 and 2, the detection unit that detects accumulation of water inside of the charging stand 300 is the water detection sensor 336 that detects water by contact. However, the detection unit is not limited to this, and may be any detection unit as long as the detection unit can detect water, or may be a detection unit that detects accumulated water by another principle.

(5) In the above-described embodiment, the electric power supplied to the vehicle 200 by the power supply facility such as the charging stand 300 may be AC power or DC power.

(6) In the above-described embodiment, the power supply target of the power supply facility such as the charging stand 300 is an electrified vehicle such as the vehicle 200. However, the power supply target of the power supply facility is not limited to this, and may be a transportation system or other device such as a drone or a mobile robot having a battery 210 and requiring power supply, or may be a plug-in hybrid electric vehicle (PHEV).

(7) The above-described embodiment can be regarded as the disclosure of the power supply system 1, the disclosure of the power supply facility such as the charging stand 300, the server 600, or the vehicle 200, and the disclosure of the control method and the control program of the power supply system 1, the power supply facility, the server 600 or the vehicle 200.

SUMMARY (1) As shown in FIGS. 1 and 2, the charging stand 300 is a power supply facility that can be stored under the ground, and includes a power supply unit for supplying electric power to the vehicle 200 on the ground (the power supply unit includes, for example, the connector 311, the power supply cable 312, and the power supply circuit 310) and the control device 330 that controls power supply by the power supply unit. As shown in FIG. 5, the control device 330 allows power supply by the power supply unit (for example, in step S314) when water is not accumulated inside of the charging stand 300 (for example, when NO is determined in step S311).

With the above, when water is not accumulated inside of the charging stand 300, the power supply unit can supply electric power to the vehicle 200. As a result, the risk of a failure due to water can be avoided.

(2) As shown in FIGS. 1 and 2, the discharge unit (for example, the drainage pipe 315 and the automatic on-off valve 314) that discharges water accumulated inside of the charging stand 300 may be further provided. With the above, water accumulated inside of the charging stand 300 can be reliably discharged.

(3) As shown in FIGS. 1 and 2, when water is accumulated inside of the charging stand 300, the control device 330 may control the discharge unit so as to discharge the accumulated water. With the above, water accumulated inside of the charging stand 300 can be reliably discharged.

(4) As shown in FIGS. 1 and 2, the water detection sensor 336 that detects accumulation of water inside of the charging stand 300 is further provided. As shown in FIG. 5, when the water detection sensor 336 detects that water is accumulated, the control device 330 determines that water is accumulated inside of the charging stand 300 (for example, step S311). With the above, accumulation of water inside of the charging stand 300 can be reliably determined.

(5) As shown in FIGS. 1 and 2, the power supply unit includes a power supply port (for example, the connector 311) and the power supply circuit 310. As shown in FIGS. 1 and 2, the charging stand 300 further includes a housing that covers the inside of the charging stand 300 including the power supply circuit 310 and the control device 330 such that water hardly enters the inside. This makes it difficult for water to enter the inside of the charging stand 300.

(6) As shown in FIGS. 1 and 2, the charging stand 300 further includes the power supply port (for example, the connector 311), the movable portion 301 that can be displaced between the position where the power supply port is housed under the ground and the position where the power supply port is exposed above the ground, and the actuator 320 that displaces the movable portion 301. The control device 330 further controls the actuator 320. With the above, the power supply port can be automatically displaced between above and below the ground.

In addition, the above-mentioned modifications may be carried out by appropriately combining all or a part thereof. The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A power supply facility that is storable under a ground, the power supply facility comprising:
   a power supply unit for supplying electric power to a vehicle on the ground; and
   a control unit configured to:
   allow the supply of the electric power by the power supply unit when water is not accumulated inside of the power supply facility, and
   prohibit the supply of the electric power by the power supply unit when water has accumulated inside of the power supply facility.

2. The power supply facility according to claim 1, further comprising a discharge unit that discharges the water accumulated inside of the power supply facility.

3. The power supply facility according to claim 2, wherein the control unit controls the discharge unit such that the accumulated water is discharged when the water is accumulated inside of the power supply facility.

4. The power supply facility according to claim 1, further comprising a detection unit that detects that the water is accumulated the inside, wherein the control unit determines that the water is accumulated inside of the power supply facility when the detection unit detects that the water is accumulated.

5. The power supply facility according to claim 4, wherein, the detection unit includes a water detection sensor provided at a bottom surface of a portion of the power supply facility that remains fixed under the ground, and when the sensor detects presence of water, the sensor outputs a signal indicating water contact to the control unit,
   wherein the control unit is further configured to:
   determine whether the signal is received;
   based upon the signal being received, transmit information to a remote server that a charging function of the power supply unit is not allowed; and
   based upon the signal not being received, transmit information to the remote server that the charging function of the power supply unit is allowed.

6. The power supply facility according to claim 1, wherein:
   the power supply unit includes a power supply port and a power supply circuit; and
   the power supply facility further includes a housing that covers the inside of the power supply facility including the power supply circuit and the control unit such that water hardly enters the inside of the power supply facility.

7. The power supply facility according to claim 6, further comprising:
   a movable portion that is provided with the power supply port and is displaceable between a position where the power supply port is stored under the ground and a position where the power supply port is exposed above the ground, and
   an actuator that displaces the movable portion; and
   the control unit further controls the actuator.

8. The power supply facility according to claim 6, wherein the control unit prohibits the supply of the electric power by controlling the power supply circuit not to operate.

9. A control method of a power supply facility that is storable under a ground, wherein:
   the power supply facility includes
   a power supply unit for supplying electric power to a vehicle on the ground, and
   a control unit that controls supply of the electric power by the power supply unit; and
   the control method includes:
   a step of allowing the supply of the electric power by the power supply unit when water is not accumulated inside of the power supply facility, and
   a step of prohibiting the supply of the electric power by the power supply unit when water has accumulated inside of the power supply facility.

10. The control method according to claim 9, wherein the power supply facility further includes a detection unit comprising a water detection sensor provided at a bottom surface of a portion of the power supply facility that remains fixed under the ground and that detects presence of water inside of the power supply facility, and outputs a signal indicating water contact to the control unit, further comprising:
    determining whether the signal is received;
    based upon the signal being received, transmitting information to a remote server that a charging function of the power supply unit is not allowed; and
    based upon the signal not being received, transmitting information to the remote server that the charging function of the power supply unit is allowed.

11. The control method according to claim 9, wherein the power supply unit includes a power supply port and a power supply circuit, and the power supply facility further includes a housing that covers the inside of the power supply facility including the power supply circuit and the control unit such that water hardly enters the inside of the power supply facility,
    wherein the step of prohibiting the supply of electric power includes controlling the power supply circuit not to operate.

* * * * *